Patented Aug. 7, 1951

2,562,945

UNITED STATES PATENT OFFICE 2,562,945

MOLDING COMPOSITION CONTAINING A REACTIVE PHENOL-ALDEHYDE CONDENSATION PRODUCT AND METHOD OF MAKING THE SAME

Paul O. Powers, Manheim Township, Lancaster County, Pa., assignor to Armstrong Cork Company, Lancaster, Pa., a corporation of Pennsylvania No Drawing. Application September 29, 1944, Serial No. 556,475

5 Claims. (Cl. 260—17.2)

This invention relates to molding compositions. It is concerned particularly with the problem of improving the water resistance of the molded product. The problem has been attacked from the standpoint of the utilization of base materials, particularly binder ingredients, which will impart the desired resistance to the product as molded, rather than from the point of improving water resistance by treatment of the product subsequent to molding.

Phenol formaldehyde resins in a partially condensed condition are commonly used in the manufacture of molding powders. The dry resin in powdered form is mixed with the base materials which generally consist largely of a fibrous filler, such as wood flour, cotton flock, or the like and color pigment. The formed products, while extensively used commercially, are not sufficiently water resistant for some purposes. This is believed to be due to the fact that the binder does not enter into the inner fibrous structure of the filler, but merely lies on the surface. This has required the use of fillers which are not moisture absorbent, such as the mineral fillers. This is objectionable where light weight is desired and can be accomplished only with a sacrifice in strength of the finished product. It also has resulted in some instances in an impairment of the surface finish of the product.

An object of the invention is to provide a molding powder which will produce a finished article possessing exceptional resistance to moisture when molded in accordance with customary practice in conventional molds.

Another object of the invention is to provide a cheap method of forming molding powders, by which the binder in solution is deposited within fibrous structure and the solvent removed by roll milling.

According to this invention a binder is formed having a sufficiently small molecular size to favor adsorption and absorption. It is highly reactive to insure a speedy cure under molding conditions. A product having these physical characteristics is one consisting essentially of a reactive partial condensation product composed largely of o-hydroxy benzyl alcohol and o-methylol-p-methylol phenol having a molecular weight below 300. This product is soluble in water in all proportions and is distributed as a water solution over the fibrous filler. Rapid penetration of the binder into the filler and impregnation of the inner fiber structure results. Subsequent to distribution of the binder solution, the water may be driven off and the product dried by roll milling the composition. Since the product is in a low stage of polymerization (possessing a molecular weight below 300), the heat developed in milling to remove water is not objectionable even though it may result in further polymerization and concomitant increase in molecular weight. This is not possible with the phenolic resins customarily used in molding powders. They are not water soluble, have a molecular weight above 700, and are not capable of displacing the moisture between the cells in the wood flour or other fibrous absorbent filler.

As an example, the following resin may be prepared:

Example I 94 grams of phenol
112.5 cc. of 37% formalin
5 grams sodium hydroxide The mol ratio of formaldehyde to phenol is equal to 1.5 to 1. The ingredients are placed in a reaction vessel, mixed thoroughly, and permitted to stand at room temperature, approximately 25° C., for approximately 72 hours. The hydrogen ion concentration of the mixture is more alkaline than pH 10 and is preferably between pH 10.5 and pH 12 during the entire reaction period. At the end of the reaction period, sufficient glacial acetic acid is added to halt the reaction and reduce the solution to pH 7–8. That quantity which is sufficient to neutralize 80% of the sodium hydroxide is generally satisfactory.

The product produced in accordance with the foregoing procedure possesses a solids content of about 50% and is completely miscible in water. The average molecular weight is well below 300. For best results, the average molecular weight should fall in the range between about 150 and about 300. The product is composed largely of o-hydroxy benzyl alcohol and o-methylol-p-methylol phenol. The product is stable for long periods of time and because of its low molecular weight, it possesses excellent penetration powers. It is capable of displacing the water held between the cell walls of the wood flour commonly employed in preparing molding compositions.

The following is another example of a product suitable for use in my molding composition:

Example II 94 grams of phenol
188 cc. of 37% formalin
3 grams of sodium hydroxide The mol ratio of formaldehyde to phenol equals 2.5 to 1. The procedure set forth in Example I is followed in making the product. In this example, as in Example I, the temperature of reaction should be maintained below 40° C. and may be carried out at normal room temperature, in the order of 25° C. This low temperature polymerization at a pH between 10.5 and 12 favors the formation of saligenin and phenol dialcohol. If the temperature of reaction is about 40° C., about 24 hours time is required to obtain the desired product.

The product produced in Example II possesses a solids content of 40%. It is completely soluble in water and is stable for long periods of time. It is composed largely of o-hydroxy benzyl alcohol and o-methylol-p-methylol phenol, has an average molecular weight below 300, and is capable of rapid penetration into wood flour and similar absorbent fibrous fillers.

With this product, it is possible to use considerably less binder than customary without detracting from the desired qualities in the finished product. With the usual phenolic resins, the minimum resin concentration is about 40% of the composition. In the preparation of typical molding powder of my invention, 30–35% of the binder is distributed over 65–70% of wood flour. The binder is dissolved in water and as a specific example, 70 pounds of binder solution formed in accordance with Example I, having a solids content of 50%, are distributed over 65 pounds of wood flour of the usual molding powder grade. The preferred practice is to incorporate the resin and wood flour in a mixing machine and after uniform distribution is obtained, to charge the mixed mass onto a pair of milling rolls where in a matter of about 20 minutes, the water is boiled out, producing a brittle sheet which may be subsequently ground or powdered and screened to the desired mesh size for molding. The proportioning of the binder and filler will vary over a relatively wide range depending upon the type of filler used and its mesh size, the type of product to be produced, the finish desired, and other variable factors. The same is true of the size to which the material is finally ground or powdered. The milling time will depend upon the size of the mill, the quantity milled per batch, the solids content of the binder, the proportioning of binder and filler, and other elements which vary.

The milling step advances the polymerization of the resin due to the heat developed and by proper control, the proper degree of cure for optimum results in molding may be attained.

Another practice which may be followed in forming a molding powder is to bake the mixture after uniform distribution of the binder over the wood flour by heating the mixture to 80° to 90° C. in an oven for about 20 hours to reduce the moisture content to about 1%. The mass is then broken, ground, or powdered, and sieved to produce a molding composition. A combination of milling and oven drying steps may be followed. For best results, the composition should be reduced to a substantially bone dry condition whether accomplished on the mill or by oven drying or both.

Obviously, the temperature of all operations up to actual molding must be maintained below that at which the binder is completely cured, although some polymerization may advantageously take place on the mill rolls as previously pointed out. Once the binder has been absorbed and adsorbed by the wood flour, an increase in the molecular weight of the binder resin is not detrimental but may be desirable. The low molecular weight is necessary only to permit proper diffusion of the binder within the structure of the filler.

It is believed that true water resistance is obtained when the binder is adsorbed by the filler, such adsorption taking place when adsorbed water naturally occurring between the cell walls by forces approaching chemical bonds in strength is displaced by resin molecules which are then held by similar forces. This resin, after cure, becomes insoluble and renders the cell walls and interstices between the cells impervious to water. Such action cannot occur with the phenolic resins customarily employed in molding powders and explains their lack of moisture resistance—the resin is water resistant but the fiber has not been rendered resistant for only capillary action has been retarded by absorption of the resin onto the fibers. With the molding powders of the present invention both absorption, which restricts capillary action, and adsorption, which limits diffusion, are obtained, thus producing a final product which is unusually resistant to moisture.

In place of phenol in the binder product, meta cresol may be used or a mixture of meta and para cresol, provided the meta cresol constitutes at least 70% of the mixture. 3,5 xylenol may be used or 3,4 xylenol may be substituted. In all instances, the pH must be more alkaline than pH 10 and the temperature must be below 40° C. in order to produce a reactive partial condensation product which is composed largely of o-hydroxy benzol alcohol and o-methylol-p-methylol phenol. In place of the 37% formalin referred to in Examples I and II, para formaldehyde may be used. In place of wood flour, other absorbent fibrous fillers may be employed, such as cotton flock or linters, alpha cellulose flock, or the like.

While I have described certain preferred embodiments of my invention, it will be understood that the same may be otherwise embodied and practiced within the scope of the following claims.

I claim:

1. A method of making molding composition comprising the steps of impregnating an absorbent fibrous filler with an impregnant consisting essentially of a reactive partial condensation product composed largely of o-hydroxy benzyl alcohol and o-methylol-p-methylol phenol having an average molecular weight below 300 dissolved in water, and removing a substantial portion of the water from said impregnated filler by roll milling.

2. A method of making a molding composition comprising the steps of distributing an impregnant consisting essentially of a water solution of a reactive partial condensation product composed largely of o-hydroxy benzyl alcohol and o-methylol-p-methylol phenol over an absorbent fibrous filler, and milling said composition to effect adsorption of said impregnant into the fibrous structure of the filler and develop heat in the composition to dry out a substantial quantity of the water and advance the resin to a degree of cure suitable for molding.

3. A method of making a molding composition comprising the steps of distributing an impregnant consisting essentially of a water solution of a reactive partial condensation product composed largely of o-hydroxy benzyl alcohol and o-methylol-p-methylol phenol over wood flour, milling said composition to effect adsorption of said impregnant into the fibrous structure of the wood flour, and continuing milling until said composition is reduced to a substantially bone-dry condition and the resin advanced to a degree of cure suitable for molding.

4. A method of making a molding composition comprising the step of milling and partial heat curing a composition containing a wood flour filler having absorbed and adsorbed thereon and therein a reactive partial condensation product composed largely of o-hydroxy benzyl alcohol and o-methylol-p-methylol phenol dissolved in water.

5. A method of making molding composition comprising the steps of depositing a water solution of a reactive partial condensation product composed largely of o-hydroxy benzyl alcohol and o-methylol-p-methylol phenol on and within the fibrous structure of an absorptive fibrous filler, and thereafter removing substantially all the water from said impregnant and partially curing the condensation product on and within the fibrous structure by developing heat within the composition by roll milling the same.

PAUL O. POWERS.

REFERENCES CITED

The following references are of record in the file of this patent:

UNITED STATES PATENTS

| Number | Name | Date |
| --- | --- | --- |
| 1,917,815 | Schmidt et al. | July 11, 1933 |
| 1,996,757 | Elbel | Apr. 9, 1935 |
| 2,091,183 | Murray et al. | Aug. 24, 1937 |
| 2,190,672 | Meharg | Feb. 20, 1940 |
| 2,240,480 | Dillehay | May 6, 1941 |
| 2,360,376 | Van Epps | Oct. 17, 1944 |